April 17, 1934. D. B. KNIGHT 1,955,298
ABSORPTION REFRIGERATING APPARATUS
Filed June 20, 1932
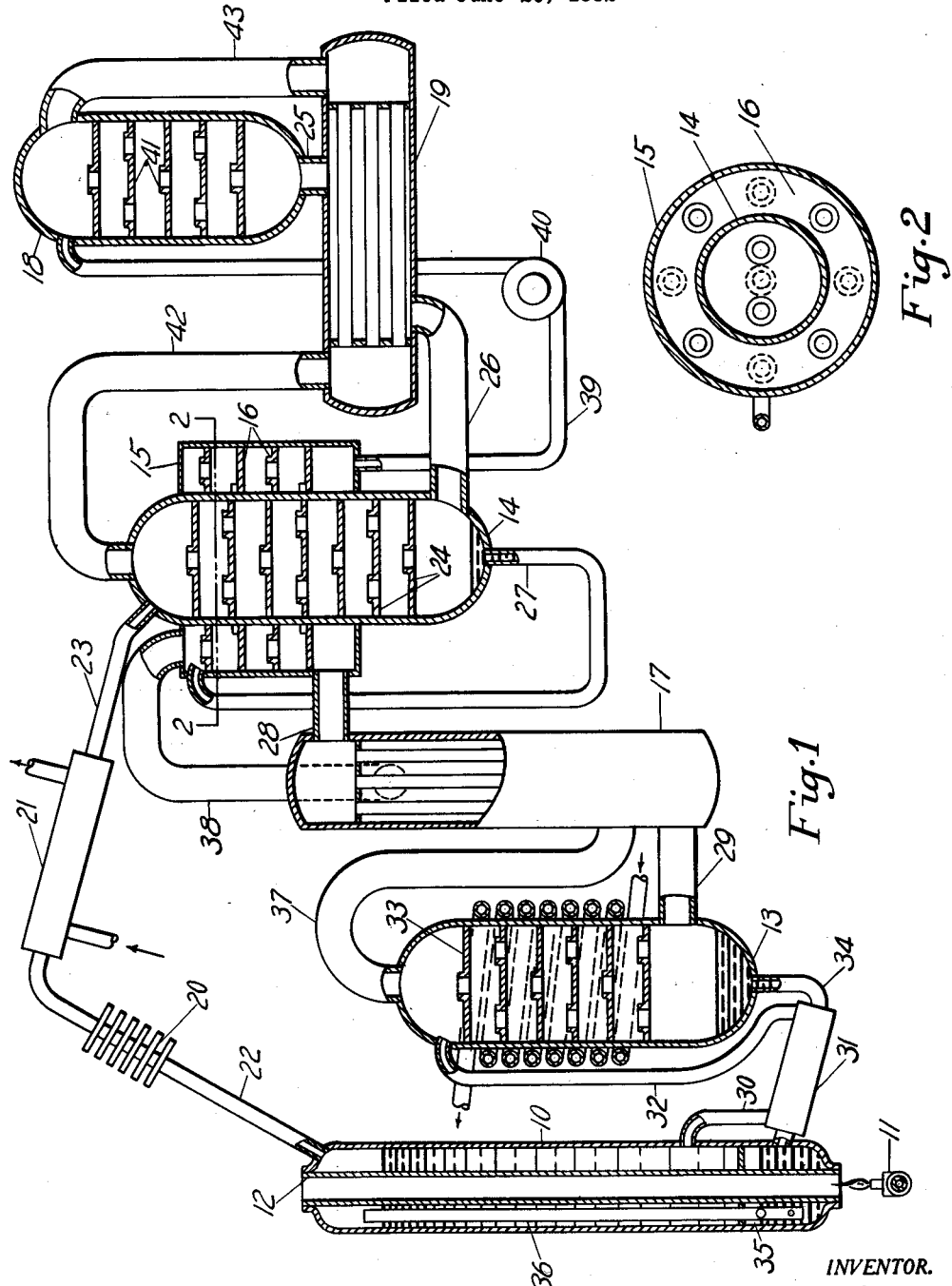
INVENTOR.
DONALD B. KNIGHT
BY
ATTORNEY.

Patented Apr. 17, 1934

1,955,298

UNITED STATES PATENT OFFICE 1,955,298

ABSORPTION REFRIGERATING APPARATUS

Donald B. Knight, Brooklyn, N. Y., assignor to Electrolux Servel Corporation, New York, N. Y., a corporation of Delaware Application June 20, 1932, Serial No. 618,103

13 Claims. (Cl. 62—119.5)

This invention relates to refrigeration and more particularly to refrigerating systems of the absorption type.

In accordance with this invention there is provided an absorption refrigerating system utilizing a plurality of cooling fluids and in which evaporation and absorption take place in several temperature stages. In this system the temperature difference between the evaporator and absorber of each stage is much less than in a system in which the same refrigerating temperature is obtained by single stage evaporation and absorption. Thus, in a system utilizing an inert pressure equalizing gas, the load on the gas heat exchanger is considerably less. Furthermore, a system contemplated by this invention operates at comparatively low pressure.

Other objects and advantages will be apparent from the following description taken in connection with the accompanying drawing, in which, Fig. 1 shows schematically, with parts in vertical section, a refrigerating system contemplated by this invention; and Fig. 2 is a section on line 2—2 of Fig. 1.

For purposes of this description it is assumed that methyl chloride and acetone are used as cooling fluids and hydrogen as an inert pressure equalizing medium. A generator 10 adapted to contain a water solution of acetone is heated by a burner 11 in a flue 12 which extends vertically through the generator. The first stage absorber 13 may be referred to as the water absorber and the second stage absorber 14 may be referred to as the acetone absorber. The latter is surrounded by a jacket or evaporator chamber 15 provided with annular baffle plates 16. This is the first stage or acetone evaporator and is interconnected through the gas heat exchanger 17 with the water absorber 13 for the circulation of inert gas therebetween, as well known in the art. The second stage or methyl chloride evaporator 18 is connected through the gas heat exchanger 19 with the acetone absorber 14 for gas circulation therebetween in the same manner.

Acetone expelled from solution in the generator 10 by heat passes in the form of vapor in conduit 22 through a rectifier 20 to the condenser 21 from which liquid acetone flows through conduit 23 into the upper part of the acetone absorber 14 where it flows downwardly over baffle plates 24. As hereinafter described methyl chloride and hydrogen in the form of a gas mixture flows from the evaporator 18 through conduit 25, gas heat exchanger 19, and conduit 26 into the acetone absorber 14 where the methyl chloride is absorbed by the liquid acetone. The solution of acetone and methyl chloride accumulates in the lower part of the absorber 14 from where it flows through conduit 27 into the upper part of the evaporator 15 where it flows downwardly over the baffle plates 16. Heat of absorption in the acetone absorber 14 is removed by the evaporation of acetone out of the solution into hydrogen in the jacket evaporator 15. The evaporation of acetone in the jacket evaporator 15 occurs due to the reduction in pressure of the acetone vapor which in turn is due to the absorption of the vapor into solution in the water absorber 13. Since methyl chloride vapor is not absorbed in the absorber 13 no evaporation of methyl chloride occurs in the evaporator 15 after equilibrium conditions are reached so that there accumulates in the lower part of the evaporator 15 a solution of high methyl chloride concentration as hereinafter set forth. The evaporation of acetone causes a lowering of temperature in the evaporator 15 in a well known manner which latter therefore cools the higher temperature absorber 14.

The resulting gas mixture of acetone and hydrogen flows from the evaporator 15 through conduit 28, gas heat exchanger 17, and conduit 29 into the water absorber 13 in which the acetone is absorbed in the weak absorption liquid which flows from the generator 10 through conduit 30, liquid heat exchanger 31, and conduit 32 into the upper part of the absorber 13 where it flows downwardly over baffle plates 33. The rich acetone solution flows from the bottom of the absorber 13 in conduit 34 through the liquid heat exchanger 31 to the heated chamber 35 from where it is raised through conduit 36 back into the generator by thermosiphonic action as well known in the art. Weak hydrogen flows from the upper part of the water absorber 13 through conduit 37, gas heat exchanger 17, and conduit 38 back to the upper part of the evaporator 15.

The solution of high methyl chloride concentration accumulates in the lower part of the evaporator 15 from where it is raised through conduit 39 by some means such as a pump 40 into the upper part of the evaporator 18. Although I have shown a mechanical pump 40 it is obvious that liquid may be raised through conduit 39 by any well known means such as vapor pressure lifts, siphons, and the like.

The methyl chloride evaporates as it flows downwardly over baffle plates 41 in the evaporator 18 and the rich gas mixture passes through conduit 25, gas heat exchanger 19, and conduit 26 into the acetone absorber 14 where, as previously described, the methyl chloride is absorbed by the acetone from condenser 21 and the weak gas returns to evaporator 18 through conduit 42, gas heat exchanger 19, and conduit 43.

The flow of solution from the acetone absorber 14 into the evaporator 15 through conduit 27 is automatic and responsive to the difference in pressure in the absorber and evaporator. Since the pressure in the absorber depends upon its temperature, which in turn depends upon the evaporation of liquid in the evaporator 15, it is obvious that the flow of liquid through conduit 27 from the absorber into the evaporator is in response to the demand for liquid to be evaporated. Although methyl chloride and acetone have been mentioned as suitable cooling fluids other combinations may be used which will meet the requirements with respect to pressure and temperature conditions and which are soluble in each other and only one of which is soluble in a suitable absorption liquid.

It will be obvious to those skilled in the art that various other changes and modifications may be made in the construction and arrangement without departing from the spirit of the invention and therefore the invention is not limited to what is shown in the drawing and described in the specification but only as indicated in the appended claims.

I claim:—

1. A refrigerating system including, a first circuit comprising an absorber and evaporator interconnected for the circulation of gas therebetween, a second circuit comprising a second absorber and second evaporator also interconnected for the circulation of gas therebetween, said second absorber and first said evaporator being arranged in heat exchange relation, a generator interconnected with first said absorber for circulation of absorption liquid therebetween, a condenser connected to receive vapor from said generator and discharge liquid into said second absorber, a conduit for liquid from said second absorber to first said evaporator, and means for transferring liquid from first evaporator to said second evaporator.

2. A refrigerating system including, a generator, a first absorber interconnected with said generator for the circulation of liquid therebetween, a first evaporator interconnected with said absorber for the circulation of gas therebetween, a second absorber arranged in heat exchange relation with said first evaporator, a second evaporator interconnected with said second absorber for the circulation of gas therebetween, a condenser connected to receive vapor from said generator and discharge liquid into said second absorber, means for conducting liquid from said second absorber to said first evaporator, and means for transferring liquid from said first evaporator to said second evaporator.

3. A refrigerator system including, a generator, a first absorber, means for circulating absorption liquid from said generator through said first absorber, a first evaporator interconnected with said first absorber through a heat exchanger for the circulation of gas therebetween, a second absorber in heat exchanger relation with said first evaporator, a second evaporator interconnected with said second absorber through a heat exchanger for the circulation of gas therebetween, a condenser connected to receive vapor from said generator and discharge liquid to said second absorber, and means forming a path of flow for liquid from said condenser through said second absorber, said first evaporator, and said second evaporator respectively.

4. A refrigerating system including, a generator, a first absorber, means for circulating absorption liquid between said generator and absorber, a second absorber, a condenser connected to receive vapor from said generator and discharge liquid into the upper part of said second absorber, a first evaporator interconnected with said first absorber for the circulation of gas therebetween and arranged in heat exchange relation with said second absorber, a conduit for liquid from the lower part of said second absorber to the upper part of said first evaporator, a second evaporator interconnected with said second absorber for the circulation of gas therebetween, and means for raising liquid from the lower part of said first evaporator to the upper part of said second evaporator.

5. A refrigerating system comprising, a first gas circuit including a first absorber and a first evaporator, a second gas circuit including a second absorber and a second evaporator, an absorption liquid circuit including said first absorber, a conduit for liquid including said second absorber, first evaporator, and second evaporator respectively, and means for removing fluid in the form of vapor from said absorption liquid circuit, liquefying the vapor, and conducting the liquid into said second absorber.

6. A refrigerating system including a first gas circuit, a second gas circuit having a portion in heat exchange relation with a portion of said first circuit, a conduit for liquid between the portions of said circuits in heat exchange relation, means for transferring cooling fluid from another portion of said first circuit to the heat exchange portion of said second circuit, and means for transferring liquid from the heat exchange portion of said first circuit to another portion of said second circuit.

7. A refrigerating system including, a first gas circuit, a second gas circuit, each having a portion in heat exchange relation with the other, means for transferring cooling fluid from another portion of said first circuit to the heat exchange portion of said second circuit, and means forming a path of flow for cooling fluid through the heat exchange portion of said first circuit, the heat exchange portion of said second circuit, and another portion of said second circuit.

8. The method of refrigerating which comprises, evaporating a first cooling fluid, absorbing the vaporous cooling fluid into a second cooling fluid in liquid phase, evaporating said second cooling fluid out of solution into an inert gas, and absorbing said second cooling fluid out of the resulting gas mixture into an absorption liquid.

9. The method of refrigerating which comprises, evaporating methyl chloride, absorbing the resulting gas into liquid acetone, evaporating the acetone out of solution into hydrogen, and absorbing the vaporous acetone out of the mixture with hydrogen into water.

10. The method of refrigerating which comprises, evaporating a first cooling fluid, absorbing the vaporous cooling fluid into a second cooling fluid in liquid phase, evaporating said second cooling fluid out of solution into an inert gas, absorbing the said second cooling fluid out of the resulting gas mixture into an absorption liquid, again evaporating said first cooling fluid, expelling said second cooling fluid from solution in the form of vapor, condensing the vapor to liquid, and again absorbing vapor of the first cooling fluid into the second liquid cooling fluid.

11. The method of refrigerating which comprises evaporating methyl chloride, absorbing the resulting vapor into liquid acetone, utilizing the heat of absorption to evaporate the acetone out of solution into an inert gas, absorbing the acetone vapor out of the resulting gas mixture into water, again evaporating the methyl chloride, expelling acetone from solution in the form of vapor, condensing the vapor to liquid, and again absorbing the methyl chloride vapor into the liquid acetone.

12. The method of refrigerating which comprises evaporating a first cooling fluid, absorbing the vaporous cooling fluid into a second cooling fluid in liquid phase, utilizing the heat of absorption to evaporate said second cooling fluid out of solution into an inert gas, and absorbing said second cooling fluid out of the resulting gas mixture into an absorption liquid.

13. The method of refrigerating which comprises, evaporating a first cooling fluid, absorbing the vaporous cooling fluid into a second cooling fluid in liquid phase, utilizing the heat of absorption to evaporate said second cooling fluid out of solution into an inert gas, absorbing the said second cooling fluid out of the resulting gas mixture into an absorption liquid, again evaporating said first cooling fluid, expelling said second cooling fluid from solution in the form of vapor, condensing the vapor to liquid, and again absorbing vapor of the first cooling fluid into the second liquid cooling fluid.

DONALD B. KNIGHT.